(12) United States Patent
Laakso, Jr. et al.

(10) Patent No.: US 7,612,149 B2
(45) Date of Patent: Nov. 3, 2009

(54) VULCANIZABLE CHLORINATED ELASTOMER COMPOSITIONS WITH IMPROVED PROCESSING SAFETY AND CURE RATE

(75) Inventors: Raymond L. Laakso, Jr., St. Francisville, LA (US); Gary R. Marchand, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 411 days.

(21) Appl. No.: 11/372,511

(22) Filed: Mar. 10, 2006

(65) Prior Publication Data

US 2006/0205889 A1    Sep. 14, 2006

Related U.S. Application Data

(60) Provisional application No. 60/661,378, filed on Mar. 14, 2005.

(51) Int. Cl.
    *C08C 19/20*    (2006.01)
    *C08C 19/22*    (2006.01)
    *C08K 5/3445*    (2006.01)
    *C08K 5/47*    (2006.01)
    *C08J 3/24*    (2006.01)

(52) U.S. Cl. ............ 525/349; 525/330.7; 525/331.4; 525/334.1; 525/350; 525/351; 525/375; 525/376; 548/125; 548/136; 548/142

(58) Field of Classification Search ......... 525/330.7, 525/331.4, 334.1, 349, 350, 351, 375, 376; 548/125, 136, 142
See application file for complete search history.

(56) References Cited

U.S. PATENT DOCUMENTS

| | | |
|---|---|---|
| 4,128,510 A | 12/1978 | Richwine |
| 4,234,705 A | 11/1980 | Matoba |
| 4,342,851 A | 8/1982 | Suzui et al. |
| 4,357,446 A | 11/1982 | Matoba |
| 4,745,147 A | 5/1988 | Honsberg |
| 5,686,537 A * | 11/1997 | Class ............ 525/349 |

FOREIGN PATENT DOCUMENTS

EP        332729 A1 * 9/1989

* cited by examiner

Primary Examiner—Roberto Rábago

(57) ABSTRACT

The instant invention is an improved cure system composition and a method for curing chlorinated elastomer compositions. The cure system composition includes a polymercapto crosslinking agent, an inorganic base, and a quaternary ammonium salt. The quaternary ammonium salt has a formula selected from the group consisting of

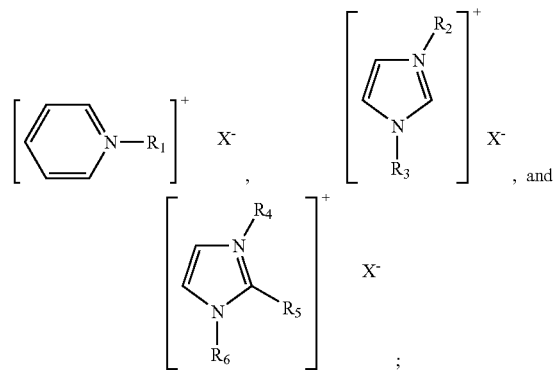

wherein $R_1$ is an alkyl or aryl group containing between 4 and 12 carbon atoms; wherein $R_2$ and $R_3$ are independently alkyl or aryl groups containing between 1 and 8 carbon atoms; wherein the total number of carbon atoms on $R_2$ and $R_3$ are between 3 and 9; wherein $R_4$ and $R_5$ are methyl groups, and $R_6$ is an alkyl group containing between 2 and 8 carbon atoms; and wherein X is an anion. The method for curing a chlorinated elastomer composition according to instant invention includes the following steps: (1) providing a chlorinated elastomer composition; (2) providing a cure system composition as described above; (3) contacting said chlorinated elastomer composition with said cure system composition; and (4) thereby curing said chlorinated elastomer composition.

12 Claims, No Drawings

VULCANIZABLE CHLORINATED ELASTOMER COMPOSITIONS WITH IMPROVED PROCESSING SAFETY AND CURE RATE

CROSS-REFERENCE TO RELATED APPLICATIONS

This application is claiming priority from U.S. Provisional Application Ser. No. 60/661,378, filed on Mar. 14, 2005 entitled "Vulcanizable Chlorinated Elastomer Compositions with Improved Processing Safety and Cure Rate," the teachings of which are incorporated by reference herein as if reproduced in full hereinbelow.

FIELD OF THE INVENTION

The present invention relates to an improved cure system for chlorinated elastomer compositions, and a method of curing chlorinated elastomer compositions.

BACKGROUND OF THE INVENTION

Chlorinated elastomers may be cured by numerous means including the use of peroxide/coagent systems, thiadiazole-based systems, or irradiation crosslinking techniques. Peroxide cures are typically preferred for their scorch safety, shelf-life or bin stability, low permanent set, and high temperature performance. However peroxide cure systems are often unacceptable for use in molded goods because of mold sticking and fouling due to volatiles or in applications that require a low temperature cure due to equipment or processing limitations.

Thiadiazole-based cure systems provide certain advantages such as the ability to cure over a wider range of temperature and pressure conditions than peroxide cures while generating fewer volatile byproducts, having good mold release characteristics, and the ability to use less expensive compounding ingredients such as aromatic oils.

Despite the excellent vulcanizate properties obtainable with the polymercapto/inorganic base/accelerator-based vulcanization systems for chlorinated elastomers, two key problems remain that limit their usefulness. The first problem is the premature vulcanization of the compound during storage (i.e. bin stability) or processing (i.e. scorch safety) prior to forming the vulcanized article, and the second problem is the inconsistency of the vulcanization rate. It is desired that the elastomer compound, after preparation, be stable under typical environmental conditions of storage and during processing of the compound such that minimal vulcanization occurs prior to formation of the finished article. A consistent vulcanization rate is desired, so that processes that form the finished vulcanized article, e.g. injection molding, extrusion, or compression molding, can be run consistently, and without the generation of scrap materials.

U.S. Pat. No. 4,745,147 discloses curable compositions of a chlorinated polyethylene, a polymercapto crosslinking agent, an acid acceptor, and a polyhydric alcohol. The composition must also contain a cure initiator such as an amine, a quaternary ammonium salt or a quaternary phosphonium salt. The onium salts are of either the formula $R_1R_2R_3R_4Z^+$ $Cl^-$ or the chloride salt of an N-substituted pyridinium ion, wherein Z is a nitrogen or phosphorous atom; $R_1$-$R_4$ may be the same or different from each other, and like the N-substitution on the pyridinium ion, are selected from $C_{1-17}$ alkyl, cyclohexyl, phenyl and benzyl groups. The polyhydric alcohol is said to improve the cure state and heat aging of crosslinked compositions.

Despite the research efforts in developing and improving in the bin stability, scorch safety, and cure rate reproducibility, there is still a need for further improvement in bin stability, and scorch safety while maintaining an acceptable cure rate.

SUMMARY OF THE INVENTION

The instant invention is an improved cure system composition and a method for curing chlorinated elastomer compositions. The cure system composition includes a polymercapto crosslinking agent, an inorganic base, and a quaternary ammonium salt. The quaternary ammonium salt has a formula selected from the group consisting of

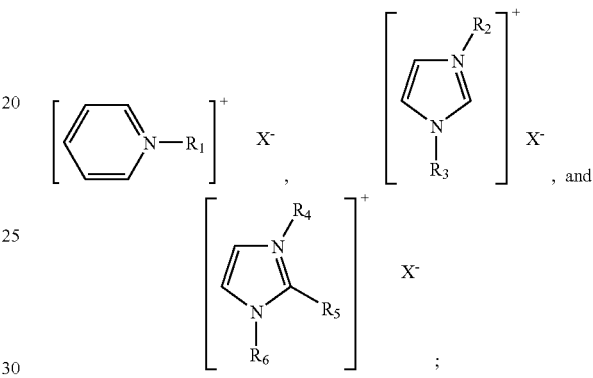

wherein $R_1$ is an alkyl or aryl group containing between 4 and 12 carbon atoms; wherein $R_2$ and $R_3$ are independently alkyl or aryl groups containing between 1 and 8 carbon atoms; wherein the total number of carbon atoms on $R_2$ and $R_3$ are between 3 and 9; wherein $R_4$ and $R_5$ are methyl groups, and $R_6$ is an alkyl group containing between 2 and 8 carbon atoms; and wherein X is an anion. The method for curing a chlorinated elastomer composition according to instant invention includes the following steps: (1) providing a chlorinated elastomer composition; (2) providing a cure system composition as described above; (3) contacting said chlorinated elastomer composition with said cure system composition; and (4) thereby curing said chlorinated elastomer composition.

DETAILED DESCRIPTION OF THE INVENTION

The cure system composition, according to instant invention, includes a polymercapto crosslinking agent, an inorganic base, and a quaternary ammonium salt. Additionally, a curable chlorinated elastomer, according to instant invention, includes a chlorinated elastomer, and a cure system composition including a polymercapto crosslinking agent, an inorganic base, and a quaternary ammonium salt.

Any polymer or copolymer containing chlorine atoms, which can be compounded to form an elastomeric product after crosslinking, can be considered a chlorinated elastomer for the purposes of this invention. Examples of chlorinated elastomers include, but are not limited to, polychloroprene, polyepichlorohydrin, epichlorohydrin/ethylene oxide copolymers, chlorosulfonated polyethylene, chlorinated butyl rubber, and chlorinated polyethylene. Chlorinated and chlorosulfonated polyethylene are especially preferred in the compositions of this invention because such elastomers are more difficult to dehydrochlorinate than the other elastomers listed above; thus, they are more sensitive to differences in accelerator.

Inorganic bases suitable for use in the compositions of this invention include, but are not limited to, metal oxides, metal hydroxides, or their salts with weak acids. The inorganic base acts as an acid acceptor to capture the hydrochloric acid that is formed as a byproduct of the curing reaction. Typical metals include, but are not limited to, those of Group IIA of the Periodic Table, such as Mg, Ca, or Ba. Specific examples of these compounds include, but are not limited to, magnesium oxide, magnesium hydroxide, calcium oxide, calcium hydroxide, barium hydroxide, magnesium carbonate, calcium carbonate, barium carbonate. Preferred basic metal oxides and hydroxides are magnesium oxide and magnesium hydroxide. The basic metal oxides are generally incorporated at levels of 2-10 parts per hundred parts (phr) of the chlorinated elastomer.

Polymercapto crosslinking agents, as used herein, refers to crosslinking agents, which contain at least two —SH groups. These crosslinking agents may sometimes be referred to as curing agents or vulcanizing agents. Specific examples of polymercapto crosslinking agents that may be employed in the compositions of this invention include, but are not limited to, 2,5-dimercapto-1,3,4-thiadiazole, and its derivatives as described in U.S. Pat. No. 4,128,510; 1,3,5-triazine-2,4,6-trithiol and its derivatives; dimercaptotriazoles as described in U.S. Pat. No. 4,234,705; 2-4-dithiohydantoins as described in U.S. Pat. No. 4,342,851; and 2,3-dimercapto-pyrazine or -quinoxalines as described in U.S. Pat. No. 4,357,446. Preferably, the crosslinking agent is 2-mercapto-1,3,4-thiadiazole-5-thiobenzoate. The polymercapto compound is typically incorporated at levels from 0.5 to 5 parts per hundred parts (phr) of the chlorinated elastomer.

Vulcanization accelerators useful in the compositions of this invention are aromatic heterocyclic quaternary ammonium salts having a general formula selected from the group consisting of

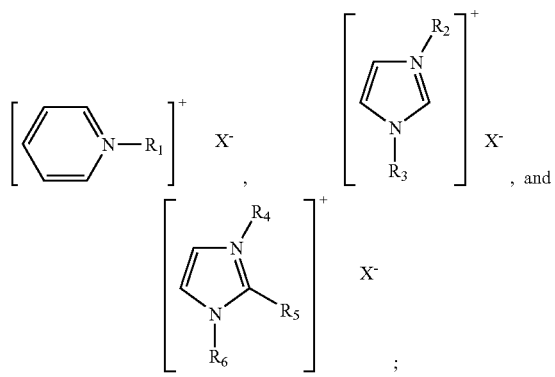

wherein $R_1$ is an alkyl or aryl group containing between 4 and 12 carbon atoms; wherein $R_2$ and $R_3$ are independently alkyl or aryl groups containing between 1 and 8 carbon atoms; wherein the total number of carbon atoms on $R_2$ and $R_3$ are between 3 and 9; wherein $R_4$ and $R_5$ are methyl groups, and $R_6$ is an alkyl group containing between 2 and 8 carbon atoms; and wherein X is an anion. Preferably $R_2$ is a methyl group. Preferred aryl groups are benzyl or phenyl. The anion, $X^-$, of the quaternary ammonium salt may include, but is not limited to chloride, bromide, hydrogen sulfate, acetate, fluoride, dihydrogen phosphate, and other anions which form stable quaternary ammonium or phosphonium salts. Particularly useful quaternary ammonium salts are 1-octylpyridinium chloride, 1-octylpyridinium bromide, 1-butyl-3-methylimidazolinium chloride, 1-hexyl-3-methylimidazolinium chloride, and 1-hexyl-2,3-dimethylimidazolinium chloride.

Compositions of the present invention may include other ingredients commonly employed in rubber vulcanization such as fillers, extenders, plasticizers, stabilizers, and pigments. The properties of the final vulcanizate can be adjusted by addition of these materials to suit the application. Examples of common fillers are calcium carbonate, carbon black, or clay. Extenders and plasticizers are usually aromatic or napthenic oils or esters. A typical pigment is titanium dioxide.

The curable compositions of this invention have a combination of good process safety (low scorch and good bin stability) and relatively fast and reproducible cure rates. Typically a scorch rate (see Test Methods) of less than 0.35 Mooney units (MU) per minute is considered safe. A cure rate (see Test Methods) of at least 3 in-lb per minute (3.4 dN·m/minute) is considered acceptable. The ratio of cure rate to scorch rate is a convenient parameter that may be employed to describe a cure system. For most processes, a ratio of at least 13 in-lb/MU (14.7 dN·m/MU) is acceptable. A bin stability (see test Methods) of less than 0.2 Mooney unit (MU) rise/hour is considered acceptable. Preferably, scorch rate is less than 0.21 MU/minute and bin stability is less than 0.1 MU rise/hour.

Typical end use applications for the curable compositions of this invention include automotive and industrial hose, wire and cable jackets, vibration isolators, flexible boots for mechanical joints, roller covers, seals, and gaskets.

The ingredients of the curable chloroelastomer composition are typically mixed and uniformly blended with the chlorinated elastomeric polymer by use of a high intensity internal mixer such as a Banbury® (Farrel Corporation) mixer. They may also be incorporated by milling on a two roll mill or by any other mechanical mixing device from which a uniform blend of the ingredients can be derived. It is preferable to mix the ingredients of the elastomeric composition such that the temperature of the composition does not exceed about 110° C. and the time of the mixing is maintained as short as is necessary to achieve a uniform composition.

The mixing process may be improved by adding some of the ingredients in a binder. For example, reaction accelerators can be bound in a polymer such as ethylene-propylene-diene rubber at concentrations of 25-75% of the accelerator; thus, making addition of small amounts of ingredient easier to handle. Whether the ingredients are added neat or in binders does not materially affect the results of this invention.

The conditions under which the elastomeric compound is crosslinked into the elastomeric product range from temperatures of from about 130° C. to about 200° C. and from atmospheric to high pressures, such as those encountered in compression or injection molding. The time for the crosslinking reaction to take place varies with the temperature and the concentrations of polymercapto compound, accelerator, and metal oxide in the composition. Lower temperatures and lower concentrations require longer times for the finished part to be crosslinked. Typical crosslinking times may be from 1 minute to several hours.

TEST METHODS

Test methods include the following:

Cure rate testing was accomplished according to ASTM D2084 on a Monsanto Oscillating Disk Rheometer (ODR) at 177° C. for 30 minutes.

Evaluation for processing safety was accomplished according to ASTM D1646 on a Monsanto MV2000E using changes in the Mooney viscosity over the course of a 25 minute test at 121° C.

For the ODR testing, ML and MH refer to the minimum and maximum torques measured during the test. The t2, t50, and t90 parameters are the time for the torque to change 2%, 50%, and 90% of the difference between MH and ML.

The maximum cure rate was obtained directly from the slope of the ODR curve by calculating the slope of the curve from point to point and taking the maximum value of the slope.

Mooney Scorch test was used to estimate processing safety. Mooney Minimum refers to the minimum viscosity observed during the test. The parameters t3, t5, and t10 refer to the time for the Mooney Viscosity to rise by 3, 5, and 10 units respectively. A scorch rate can be calculated by dividing 2 by the difference between t5 and t3. However, if the Mooney viscosity fails to change more than 3-5 units during the test, a scorch rate can be calculated using the following Equation 1.

Scorch Rate=(Mooney Viscosity @25 min–Mooney Minimum)/(25 min–time @Mooney Minimum)    Equation 1

A measure of the bin stability, (i.e. the safety of the compound to changes in viscosity during storage of the compound) was obtained by examining the difference between the Mooney minimum viscosity after storage for one week (168 hours) at 43° C. and 90% relative humidity versus the original Mooney minimum viscosity measured directly after the compound was made. Equation 2 shows the relevant measure of the rate of change in the Mooney viscosity during storage (increase in Mooney units "MU" per hour).

Bin Rate (MU/hour)=[MU(aged)–MU(original)]/168 hours    Equation 2

EXAMPLES

The following non-limiting examples illustrate the present invention, but are not intended to limit the scope of the invention. These non-limiting examples of the instant invention demonstrate that high vulcanization rates can be maintained while improving the processing safety and the bin stability of the compound by choosing an accelerator based on the specified range of alkylpyridinium or imidazolinium compounds.

The non-limiting examples illustrate the unexpected results of the instant invention, i.e. the combination of bin stability, scorch safety, and cure rate of polymercapto curable chlorinated elastomer compositions can be optimized by employing an aromatic heterocyclic quaternary ammonium salt as accelerator, and by proper selection of the number of carbon atoms present in the groups that are bonded to the nitrogen atom(s) of the accelerator.

Examples 1-15 and Comparative Examples 1-6

Each of the compositions in Tables I, II and III was mixed using a Banbury® BR (Farrel Corporation) internal mixer. The dry ingredients were charged to the mixer first, followed by the liquid ingredients, and then the halogenated elastomer. A slow mixing speed was used. The Banbury chute was swept down after the compound had fluxed and was dumped from the mixer at 105° C. The compound discharged from the mixer was placed on a 6 inch×13 inch two roll mill, and was rolled as it came off the mill. This mill procedure was repeated an additional 5-6 times to ensure adequate dispersion of all the ingredients. The final sheet was obtained from the mill in a thickness of approximately 3 mm. Samples cut from this final sheet were used to measure cure rates, and processing safety of the compositions. All accelerators were added such that 0.0011 moles of the accelerator was employed per 100 grams of the rubber used in the composition.

Tables IV, V and VI show the results of the rates of viscosity increase during the cure, processing, and bin storage of the compounds of the present invention and from comparative examples. A valuable tool for comparison is to look at the ratio of the cure rate (CR) to that of processing, i.e. scorch rate (SR) or bin rates (BR). It is desirable to have a high ratio of cure/scorch (CR/SR) and cure/bin (CR/BR). A particular compound can be optimized for both if the product of the two ratios, cure/scorch and cure/bin (CR.CR/SR.BR) is examined. These ratios are given for each composition of the invention and for comparative compositions in Tables IV to VI. Surprisingly, the curable compositions of this invention containing an aromatic heterocyclic accelerator have a much improved combination of bin stability, scorch safety and cure rate than do similar compositions, but containing an aliphatic quaternary ammonium salt accelerator.

TABLE I

| Ingredient | Comparative Example 1 | Example 1 | Example 2 | Example 3 | Example 4 | Comparative Example 2 | Comparative Example 3 | Example 5 | Example 6 |
|---|---|---|---|---|---|---|---|---|---|
| Chlorinated Polyethylene[1] | 100 | 100 | 100 | 100 | 100 | 100 | 100 | 100 | 100 |
| Carbon Black[2] | 50 | 50 | 50 | 50 | 50 | 50 | 50 | 50 | 50 |
| Magnesium Hydroxide[3] | 5 | 5 | 5 | 5 | 5 | 5 | 5 | 5 | 5 |
| Aromatic Oil[4] | 30 | 30 | 30 | 30 | 30 | 30 | 30 | 30 | 30 |
| 2-mercapto-1,3,4-thiadiazole-5-thiobenzoate[5] | 2.67 | 2.67 | 2.67 | 2.67 | 2.67 | 2.67 | 2.67 | 2.67 | 2.67 |
| ethylpyridinium chloride[6] | 0.15 | | | | | | | | |
| butylpyridinium chloride[7] | | 0.18 | | | | | | | |
| hexylpyridinium chloride[8] | | | 0.21 | | | | | | |
| octylpyridinium chloride[9] | | | | | 0.24 | | | | |
| dodecylpyridinium chloride hydrate[10] | | | | | | 0.3 | | | |

TABLE I-continued

| Ingredient | Comparative Example 1 | Example 1 | Example 2 | Example 3 | Example 4 | Comparative Example 2 | Comparative Example 3 | Example 5 | Example 6 |
|---|---|---|---|---|---|---|---|---|---|
| hexadecylpyridinium chloride[11] | | | | | | 0.38 | | | |
| ethylpyridinium bromide[12] | | | | | | | 0.2 | | |
| butylpyridinium bromide[13] | | | | | | | | 0.23 | |
| hexylpyridinium bromide[14] | | | | | | | | | 0.26 |

[1]Tyrin ® CM0836 available from DuPont Dow Elastomers L.L.C.
[2]N-774 available from Sid Richardson Carbon Co.
[3]StanMag ® Hydroxide B available from Harwick
[4]Sundex ® 790T available from Sunoco, Inc.
[5]Mastermix ® MB 4842 (75% active) available from Harwick
[6-14]available from Aldrich

TABLE II

| Ingredient | Example 7 | Example 8 | Example 9 | Example 10 | Example 11 | Example 12 | Example 13 | Example 14 | Example 15 |
|---|---|---|---|---|---|---|---|---|---|
| Chlorinated Polyethylene[1] | 100 | 100 | 100 | 100 | 100 | 100 | 100 | 100 | 100 |
| Carbon Black[2] | 50 | 50 | 50 | 50 | 50 | 50 | 50 | 50 | 50 |
| Magnesium Hydroxide[3] | 5 | 5 | 5 | 5 | 5 | 5 | 5 | 5 | 5 |
| Aromatic Oil[4] | 30 | 30 | 30 | 30 | 30 | 30 | 30 | 30 | 30 |
| 2-mercapto-1,3,4-thiadiazole-5-thiobenzoate[5] | 2.67 | 2.67 | 2.67 | 2.67 | 2.67 | 2.67 | 2.67 | 2.67 | 2.67 |
| 1-ethyl-3-methylimidazolinium chloride[6] | 0.15 | | | | | | | | |
| 1-butyl-3-methylimidazolinium chloride[7] | | 0.18 | | | | | | | |
| 1-hexyl-3-methylimidazolinium chloride[8] | | | 0.21 | | | | | | |
| 1-octyl-3-methylimidazolinium chloride[9] | | | | 0.24 | | | | | |
| 1-decyl-3-methylimidazolinium chloride[10] | | | | | 0.27 | | | | |
| 1-butyl-3-methylimidazolinium bromide[11] | | | | | | 0.23 | | | |
| 1-decyl-3-methylimidazolinium bromide[12] | | | | | | | 0.32 | | |
| 1-butyl-2,3-dimethylimidazolinium chloride[13] | | | | | | | | 0.2 | |
| 1-hexyl-2,3-dimethylimidazolinium chloride[14] | | | | | | | | | 0.23 |

[1]Tyrin ® CM0836 available from DuPont Dow Elastomers L.L.C.
[2]N-774 available from Sid Richardson Carbon Co
[3]StanMag ® Hydroxide B available from Harwick
[4]Sundex ® 790T available from Sunoco, Inc.
[5]Mastermix ® MB 4842 (75% active) available from Harwick
[6-14]available from Aldrich

TABLE III

| Ingredient | Comparative Example 4 | Comparative Example 5 | Comparative Example 6 |
|---|---|---|---|
| Chlorinated Polyethylene[1] | 100 | 100 | 100 |
| Carbon Black[2] | 50 | 50 | 50 |
| Magnesium Hydroxide[3] | 5 | 5 | 5 |
| Aromatic Oil[4] | 30 | 30 | 30 |
| 2-mercapto-1,3,4-thiadiazole-5-thiobenzoate[5] | 2.67 | 2.67 | 2.67 |
| 3,5-diethyl-1,2-dihydro-1-phenyl-2-propylpyridine[6] | 0.23 | | |
| Tetrapropyl ammonium bromide[7] | | 0.27 | |
| Tetrabutyl ammonium bromide[8] | | | 0.33 |

[1]Tyrin ® CM0836 available from DuPont Dow Elastomers L.L.C.
[2]N-774 available from Sid Richardson Carbon Co.
[3]StanMag ® Hydroxide B available from Harwick
[4]Sundex ® 790T available from Sunoco, Inc.
[5]Mastermix ® MB 4842 (75% active) available from Harwick
[6]Vanax 808 HP available from R. T. Vanderbilt
[7,8]available from Aldrich

TABLE IV

| Property | Units | Comparative Example 1 | Example 1 | Example 2 | Example 3 | Example 4 | Comparative Example 2 | Comparative Example 3 | Example 5 | Example 6 |
|---|---|---|---|---|---|---|---|---|---|---|
| Mooney Scorch @121° C., Test Time 30 minutes | | | | | | | | | | |
| Initial Viscosity | [MU] | 39.3 | 39.3 | 39.1 | 40.9 | 39 | 41.3 | 39.5 | 40.6 | 39.9 |

TABLE IV-continued

| Property | Units | Comparative Example 1 | Example 1 | Example 2 | Example 3 | Example 4 | Comparative Example 2 | Comparative Example 3 | Example 5 | Example 6 |
|---|---|---|---|---|---|---|---|---|---|---|
| Minimum Viscosity | [MU] | 33.7 | 33.7 | 33.6 | 35.5 | 34 | 36.5 | 34 | 34.5 | 34.5 |
| t3 | [min] | | | | 24.22 | 18.33 | 13.85 | | | |
| t5 | [min] | | | | | 29.47 | 21.05 | | | |
| t10 | [min] | | | | | | | | | |
| Mooney Scorch @121° C., Test Time 30 minutes, after Aging 7 days @43° C., 90% Relative Humidity | | | | | | | | | | |
| Initial Viscosity | [MU] | 46.3 | 47.7 | 50.6 | 59.7 | 52.3 | 61.7 | 46.5 | 50.5 | 52.2 |
| Minimum Viscosity | [MU] | 36.9 | 37.8 | 40.4 | 48.3 | 44.9 | 54.4 | 37.2 | 39.7 | 41.3 |
| t3 | [min] | | | | | 15.4 | 7.13 | | | |
| t5 | [min] | | | | | 25.67 | 9.67 | | | |
| t10 | [min] | | | | | | | | | |
| ODR Test @ 177° C., Test Time 30 minutes | | | | | | | | | | |
| ML (min) | [in-lb] | 11.52 | 12.06 | 12.48 | 13.67 | 11.76 | 13.59 | 11.77 | 12.06 | 12.06 |
| MH (max) | [in-lb] | 38.58 | 47.63 | 51.32 | 56.43 | 57.44 | 60.74 | 41.31 | 47.71 | 50.18 |
| ts1 | [min] | 3.31 | 2.74 | 1.98 | 1.69 | 1.5 | 1.38 | 3.39 | 2.66 | 2.14 |
| ts2 | [min] | 4.45 | 3.38 | 2.4 | 1.97 | 1.75 | 1.62 | 4.55 | 3.4 | 2.6 |
| t2 | [min] | 2.73 | 2.51 | 1.88 | 1.64 | 1.47 | 1.37 | 2.87 | 2.42 | 2 |
| t50 | [min] | 13 | 8.68 | 6.25 | 4.66 | 4.71 | 4.08 | 13.1 | 9.47 | 6.74 |
| t90 | [min] | 25.35 | 19.62 | 14.65 | 11.13 | 11.45 | 10.06 | 25.03 | 20.15 | 14.81 |
| Scorch Rate, SR | [MU/min] | 0.073 | 0.087 | 0.111 | 0.139 | 0.207 | 0.263 | 0.090 | 0.097 | 0.096 |
| Cure Rate (Maximum), CR | [in-lb/min] | 1.6 | 3.63 | 5.38 | 8.57 | 8.09 | 10.53 | 1.77 | 3.11 | 4.86 |
| Bin Rate, BR | [MU/h] | 0.017 | 0.021 | 0.035 | 0.067 | 0.065 | 0.1065 | 0.017 | 0.027 | 0.035 |
| CR/SR | [in-lb/MU] | 22 | 42 | 48 | 62 | 39 | 38.6 | 20 | 32 | 51 |
| CR/BR | [in-lb · h/ MU · min] | 96 | 170 | 152 | 129 | 125 | 98.9 | 106 | 115 | 137 |
| CR · CR/SR · BR | [(in-lb · h/ MU · min)$^2$] | 2092 | 7112 | 7355 | 7954 | 4872 | 3814 | 2096 | 3668 | 6940 |

TABLE V

| Property | Units | Example 7 | Example 8 | Example 9 | Example 10 | Example 11 | Example 12 | Example 13 | Example 14 | Example 15 |
|---|---|---|---|---|---|---|---|---|---|---|
| Mooney Scorch @121° C., Test Time 30 minutes | | | | | | | | | | |
| Initial Viscosity | [MU] | 39.2 | 39.5 | 38.8 | 39.5 | 39.9 | 39 | 40.3 | 39.6 | 41.4 |
| Minimum Viscosity | [MU] | 33.3 | 34.1 | 34 | 34.2 | 34.4 | 33.6 | 35.9 | 34.5 | 36.3 |
| t3 | [min] | | | 18.13 | 16.17 | 20.7 | | 12.84 | | 19.68 |
| t5 | [min] | | | | 27.67 | | | 18.85 | | |
| t10 | [min] | | | | | | | | | |
| Mooney Scorch @121° C., Test Time 30 minutes, after Aging 7 days @43° C., 90% Relative Humidity | | | | | | | | | | |
| Initial Viscosity | [MU] | 44.2 | 47.1 | 52 | 49.9 | 51.4 | 46.9 | 65.1 | 50.5 | 59.2 |
| Minimum Viscosity | [MU] | 36.6 | 38.4 | 43.9 | 42.6 | 44.2 | 37.3 | 59.4 | 40.5 | 48.5 |
| t3 | [min] | | | 24.36 | 17.13 | 9.45 | | 6.32 | | 26.01 |
| t5 | [min] | | | | 26.88 | 13.47 | | 8.5 | | |
| t10 | [min] | | | | | | | | | |
| ODR Test @ 177° C., Test Time 30 minutes | | | | | | | | | | |
| ML (min) | [in-lb] | 12.1 | 12.39 | 12.82 | 12.83 | 12.13 | 11.74 | 13.78 | 12.41 | 14.33 |
| MH (max) | [in-lb] | 48.84 | 50.36 | 52.88 | 57.33 | 57.24 | 48.44 | 58.23 | 50.05 | 55.54 |
| ts1 | [min] | 2.07 | 2.13 | 1.59 | 1.52 | 1.87 | 2.49 | 1.29 | 1.76 | 1.45 |
| ts2 | [min] | 2.49 | 2.59 | 1.86 | 1.8 | 2.22 | 3.06 | 1.49 | 2.11 | 1.67 |
| t2 | [min] | 1.94 | 2 | 1.52 | 1.49 | 1.83 | 2.31 | 1.26 | 1.66 | 1.4 |
| t50 | [min] | 7.7 | 7.03 | 4.46 | 4.87 | 5.93 | 8.45 | 3.62 | 5.21 | 3.85 |
| t90 | [min] | 19.43 | 15.22 | 9.86 | 10.94 | 12.35 | 17.39 | 8.66 | 12.95 | 10.05 |
| Scorch Rate, SR | [MU/min] | 0.102 | 0.105 | 0.185 | 0.199 | 0.164 | 0.102 | 0.313 | 0.107 | 0.169 |
| Cure Rate (Maximum), CR | [in-lb/min] | 3.6 | 4.36 | 8.125 | 7.5 | 6.53 | 3.46 | 11 | 6.4 | 10.25 |
| Bin Rate, BR | [MU/h] | 0.020 | 0.026 | 0.059 | 0.050 | 0.058 | 0.022 | 0.140 | 0.031 | 0.064 |
| CR/SR | [in-lb/MU] | 35 | 42 | 44 | 38 | 40 | 34 | 35 | 60 | 61 |
| CR/BR | [in-lb · h/MU · min] | 184 | 170 | 138 | 150 | 113 | 157 | 79 | 205 | 161 |
| CR · CR/SR · BR | [(in-lb · h/ MU · min)$^2$] | 6472 | 7086 | 6071 | 5647 | 4495 | 5347 | 2764 | 12210 | 9788 |

TABLE VI

| Property | Units | Comparative Example 4 | Comparative Example 5 | Comparative Example 6 |
|---|---|---|---|---|
| Mooney Scorch @121° C., Test Time 30 minutes | | | | |
| Initial Viscosity | [MU] | 43.1 | 41.1 | 41.7 |
| Minimum Viscosity | [MU] | 38.1 | 36.2 | 37.6 |
| t3 | [min] | 14.3 | 12.98 | 7.67 |
| t5 | [min] | 24.2 | 20.23 | 10.09 |
| t10 | [min] | | | 17.13 |
| Mooney Scorch @121° C., Test Time 30 minutes, after Aging 7 days @43° C., 90% Relative Humidity | | | | |
| Initial Viscosity | [MU] | 83.3 | 61.3 | 108.1 |
| Minimum Viscosity | [MU] | 71.7 | 52.9 | 90.5 |
| t3 | [min] | 12.8 | 12.83 | 8.12 |
| t5 | [min] | | | 10.36 |
| t10 | [min] | | | 18.39 |
| ODR Test @ 177° C., Test Time 30 minutes | | | | |
| ML (min) | [in-lb] | 14.33 | 14.03 | 14.79 |
| MH (max) | [in-lb] | 57.02 | 46.77 | 53.21 |
| ts1 | [min] | 1.37 | 1.38 | 1.09 |
| ts2 | [min] | 1.58 | 1.64 | 1.26 |
| t2 | [min] | 1.34 | 1.28 | 1.04 |
| t50 | [min] | 3.46 | 4.33 | 3.25 |
| t90 | [min] | 8.3 | 13.06 | 8.73 |
| Scorch Rate, SR | [MU/min] | 0.202 | 0.276 | 0.858 |
| Cure Rate (Maximum), CR | [in-lb/min] | 10.45 | 6.11 | 9.56 |
| Bin Rate, BR | [MU/h] | 0.2 | 0.1 | 0.31 |
| CR/SR | [in-lb/MU] | 52 | 22 | 11 |
| CR/BR | [in-lb · h/MU · min] | 52 | 61 | 31 |
| CR · CR/SR · BR | [(in-lb · h/MU · min)$^2$] | 2703 | 1353 | 344 |

We claim:

1. A cure system composition consisting essentially of:
   a polymercapto crosslinking agent, wherein said polymercapto crosslinking agent is 2-mercapto-1,3,4-thiadiazole-5-thiobenzoate;
   an inorganic base; and
   a quaternary ammonium salt selected from the group consisting of 1-octylpyridinium chloride, 1-octylpyridinium bromide, 1-butyl-3-methylimidazolinium chloride, 1-hexyl-3-methylimidazolinium chloride, and 1-hexyl-2,3-dimethylimidazolinium chloride.

2. A curable chlorinated elastomer composition consisting essentially of:
   a chlorinated elastomer;
   a polymercapto crosslinking agent, wherein said polymercapto crosslinking agent is 2-mercapto-1,3,4-thiadiazole-5-thiobenzoate;
   an inorganic base; and
   a quaternary ammonium salt selected from the group consisting of 1-octylpyridinium chloride, 1-octylpyridinium bromide, 1-butyl-3-methylimidazolinium chloride, 1-hexyl-3-methylimidazolinium chloride, and 1-hexyl-2,3-dimethylimidazolinium chloride.

3. The curable chlorinated elastomer composition according to claim 2, wherein said chlorinated elastomer is selected from the group consisting of polychloroprene, polyepichlorohydrin, epichlorohydrin/ethylene oxide copolymers, chlorosulfonated polyethylene, chlorinated polyethylene, and chlorinated butyl rubbers.

4. The curable chlorinated elastomer composition according to claim 3, wherein said chlorinated elastomer is chlorinated polyethylene.

5. An article comprising at least one component formed from a cured composition, wherein said cured composition being formed from a curable chlorinated elastomer composition consisting essentially of:
   a chlorinated elastomer;
   a polymercapto crosslinking agent, wherein said polymercapto crosslinking agent is 2-mercapto-1,3,4-thiadiazole-5-thiobenzoate;
   an inorganic base; and
   a quaternary ammonium salt selected from the group consisting of 1-octylpyridinium chloride, 1-octylpyridinium bromide, 1-butyl-3-methylimidazolinium chloride, 1-hexyl-3-methylimidazolinium chloride, and 1-hexyl-2,3-dimethylimidazolinium chloride.

6. The article according to claim 5, wherein said chlorinated elastomer is selected from the group consisting of polychloroprene, polyepichlorohydrin, epichlorohydrin/ethylene oxide copolymers, chlorosulfonated polyethylene, chlorinated polyethylene, and chlorinated butyl rubbers.

7. The article according to claim 6, wherein said chlorinated elastomer is chlorinated polyethylene.

8. A method of curing a chlorinated elastomer composition comprising the steps of:
   providing a chlorinated elastomer composition;
   providing a cure system composition consisting essentially of:
      a polymercapto crosslinking agent, wherein said polymercapto crosslinking agent is 2-mercapto-1,3,4-thiadiazole-5-thiobenzoate;
      an inorganic base; and
      a quaternary ammonium salt selected from the group consisting of 1-octylpyridinium chloride, 1-octylpyridinium bromide, 1-butyl-3-methylimidazolinium chloride, 1-hexyl-3-methylimidazolinium chloride, and 1-hexyl-2,3-dimethylimidazolinium chloride; contacting said chlorinated elastomer composition with said cure system composition, and thereby curing said chlorinated elastomer composition.

9. The method of curing a chlorinated elastomer composition according to claim 8, wherein said chlorinated elastomer composition and said cure system composition are admixed.

10. The method of curing a chlorinated elastomer composition according to claim 8, wherein said contacting step is conducted in a temperature range of 130° C. to 200° C.

11. The method of curing a chlorinated elastomer composition according to claim 8, wherein said chlorinated elastomer is selected from the group consisting of polychloroprene, polyepichlorohydrin, epichlorohydrin/ethylene oxide copolymers, chlorosulfonated polyethylene, chlorinated polyethylene, and chlorinated butyl rubbers.

12. The method of curing a chlorinated elastomer composition according to claim 11, wherein said chlorinated elastomer is chlorinated polyethylene.

* * * * *